United States Patent [19]

Johnson

[11] Patent Number: 5,008,796
[45] Date of Patent: Apr. 16, 1991

[54] APPARATUS AND METHOD FOR IMPROVING LOAD REGULATION IN SWITCHING POWER SUPPLIES

[75] Inventor: William M. Johnson, Lexington, Ky.

[73] Assignee: International Business Machines Corporation, Armonk, N.Y.

[21] Appl. No.: 533,973

[22] Filed: Jun. 6, 1990

[51] Int. Cl.$^5$ ............................................. H02M 3/335
[52] U.S. Cl. ........................................ 363/21; 363/56; 363/97
[58] Field of Search ........................ 363/20, 21, 41, 56, 363/95, 97, 131

[56] References Cited

U.S. PATENT DOCUMENTS

| | | | |
|---|---|---|---|
| 3,564,393 | 2/1971 | Williamson | 363/21 |
| 3,889,173 | 6/1975 | Klusmann et al. | 321/2 |
| 4,005,351 | 1/1977 | Blum | 363/21 |
| 4,013,938 | 3/1977 | McCoy | 363/56 |
| 4,063,307 | 12/1977 | Stephens | 363/21 |
| 4,459,651 | 7/1984 | Fenter | 363/21 |
| 4,566,060 | 1/1986 | Hoeksma | 363/21 |
| 4,595,974 | 6/1986 | Lethellier | 363/21 |
| 4,608,625 | 8/1986 | Josephson et al. | 363/21 |
| 4,658,342 | 4/1987 | Wharton | 363/21 |
| 4,679,131 | 7/1987 | Filliman | 363/21 |
| 4,704,670 | 11/1987 | Gradl et al. | 363/21 |
| 4,739,462 | 4/1988 | Farnsworth et al. | 363/21 |

Primary Examiner—Peter S. Wong
Attorney, Agent, or Firm—Calfee, Halter & Griswold

[57] ABSTRACT

A circuit for limiting the effect of overshoot in a transformer of the type having a primary winding and a secondary winding. The secondary winding is coupled to a load and the circuit has an output. An auxiliary or ballistic winding is operatively connected to the transformer and is adapted to generate a winding voltage which varies in response to a voltage generated across the primary winding. An electronic switch, preferably a transistor, is interposed between the ballistic winding and the output of the circuit. The switch is capable of being disposed in a first position or a second position. In one preferred embodiment, the winding voltage is communicated to the circuit output when the switch is in the first position. An actuating arrangement is coupled with both of the ballistic winding and the electronic switch. The electronic switch is disposed into the first position by the actuating arrangement a predetermined time interval after the winding voltage has exceeded a predetermined reference voltage. Accordingly, overshoot is eliminated in the output voltage of the circuit and load regulation of the transformer is improved.

22 Claims, 2 Drawing Sheets

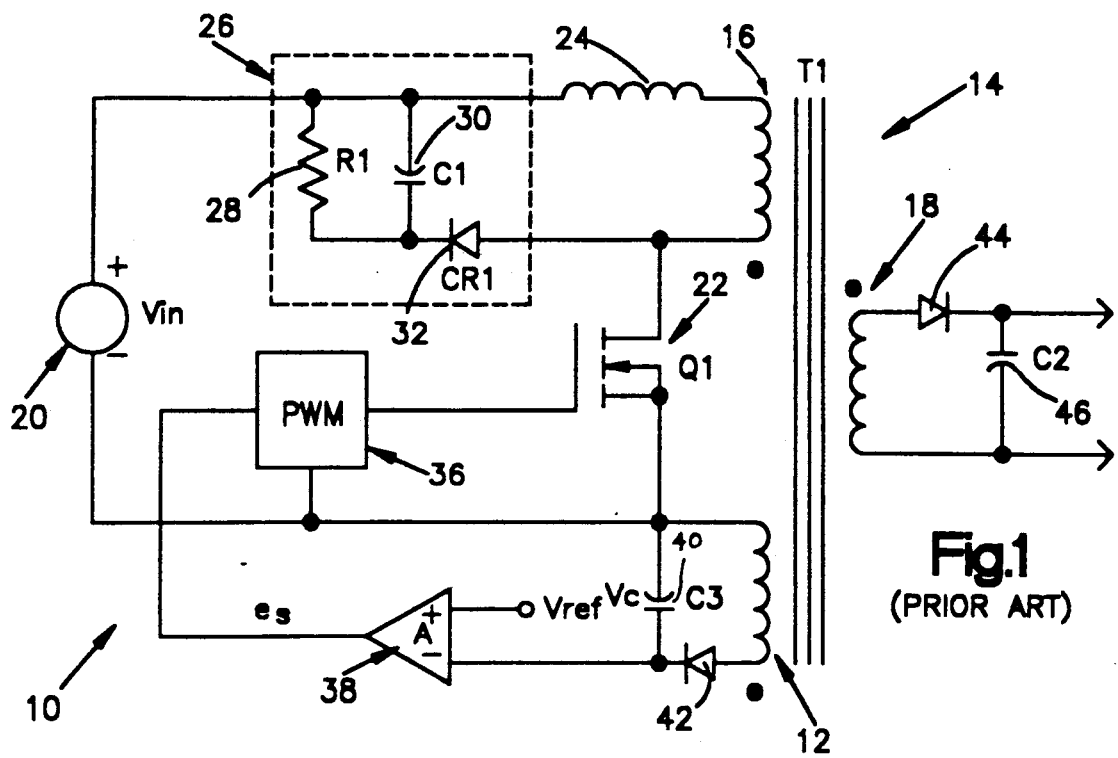
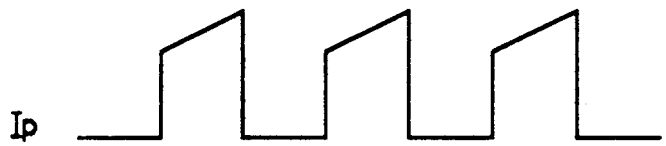
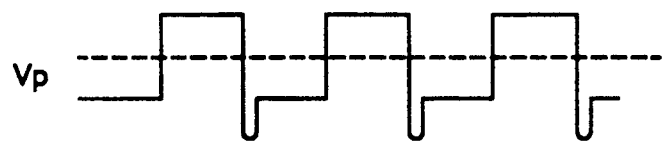
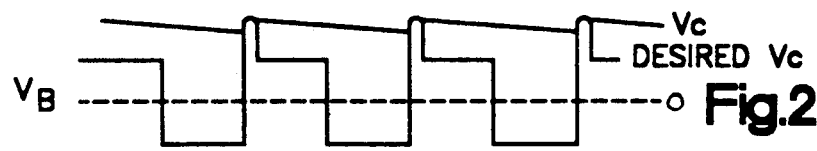
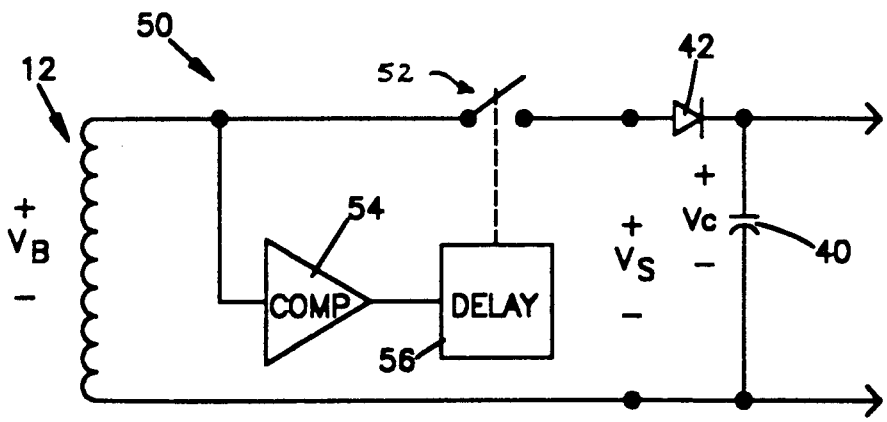

APPARATUS AND METHOD FOR IMPROVING LOAD REGULATION IN SWITCHING POWER SUPPLIES

BACKGROUND OF THE INVENTION

The present invention relates to a switched sensing technique and more specifically to an apparatus and method for improving load regulation in switching power supplies which typically employ ballistic sense windings.

Switching power supplies, incorporating transformers about which a primary winding and a secondary winding are wrapped, can be particularly useful for applying power to different electrical loads. In certain applications, it is necessary to provide regulated voltage levels to the loads. To achieve such regulation, the power supply may include a regulator circuit employing feedback to control current and/or voltage.

The feedback can be obtained by directly sensing the output. For example, in U.S. Pat. No. 4,566,060 to Hoeksma, output is supplied to the load and a signal from the load is consequently transmitted across an isolating feedback member. The feedback member preferably includes an optocoupler, which may include a light-emitting diode and a photo-transistor. While this technique of load regulation is effective, it is disadvantageous from a cost viewpoint since an optocoupler must be employed to cross the barrier between the primary winding and the secondary winding.

Ballistic sense windings have been used to provide an inexpensive technique for regulating the outputs of switching power supplies. In the typical circuit employing the ballistic sense winding, good coupling can generally be achieved between the primary winding and the secondary winding, as well as between the primary winding and the ballistic winding. Due to the good coupling between the primary and ballistic windings, voltage overshoot occurring on the primary winding, in response to leakage between the primary and secondary windings, may occur on the ballistic winding. This can lead to severe load regulation problems since overshoot in the ballistic winding leads to improper control of the primary winding and hence poor regulation of output voltage.

There are at least two known techniques having the object of alleviating load regulation problems arising as a result of overshoot in the ballistic winding. First, a resistor or inductor is used in series with the ballistic winding to filter out the overshoot. The filtering resistor or inductor is generally sized to compensate for peak load cases in which overshoot is most severe. Consequently, for minimum loads, the filtering resistor or inductor not only filters out the overshoot, but also has an averaging effect on the entire ballistic waveform. This averaging effect can lead to inadequate load regulation, particularly when the power supply must function from no load to full load.

Second, the regulating circuit can be designed to compensate for overshoot. For example, U.S. Pat. No. 4,658,342 to Wharton, is directed toward a circuit that compensates the duty cycle of a transistor, which is coupled to the primary winding, in response to load changes. In particular, duration of the transistor duty cycle depends on a composite feedback signal which is generated by the ballistic winding operating in conjunction with two filter circuits. As circuit loading increases, the composite feedback signal is used to increase the conduction time of the transistor to hold the outputs within regulation requirements.

It is believed that neither of the above prior art techniques employing ballistic windings represent effective or economical solutions to problems arising as a result of overshoot caused by leakage inductance. While the technique in which a series resistor or inductor is used represents an economical approach, it has the above-discussed undesirable effect on the ballistic waveform. The Wharton arrangement, which is not very economical, may not even be consistently effective in regulating load since the Wharton arrangement does not eliminate overshoot. In particular, while the Wharton approach of prolonging the duty cycle of the transistor to compensate overshoot may be sound in theory, the amount of overshoot encountered varies from load to load and it is not clear how the interval over which duty cycle must be prolonged can be readily set for each of the many increases or decreases in load.

SUMMARY OF THE INVENTION

A circuit is provided for limiting overshoot in a transformer having a primary winding and a secondary winding coupled thereto. The circuit includes winding means, which winding means is operatively connected to the transformer and generates a winding voltage in response to a voltage generated across the primary winding. Switching means, which can be disposed in either a first position or a second position, is interposed between the sensing means and an output of the circuit. Switch actuating means is operatively connected to the switching means for disposing the same in the first position a predetermined time interval after the winding voltage has exceeded a predetermined reference voltage.

In the preferred embodiment, the switch actuating means includes time delay means for setting the predetermined time interval. The predetermined time interval can be defined by the time constant of a capacitor and one or two resistors, each of which is coupled to the sensing means. Additionally, a transistor preferably functions as the switch, and the transistor is disposed in the first position when the capacitor is charged to a second predetermined reference voltage.

In a preferred form of operation, the winding means, which is coupled with the capacitor, begins to charge the capacitor once the winding voltage exceeds the first predetermined reference voltage, which in one preferred example is 0 volts. Charging of the capacitor continues through the resistors until the voltage of the capacitor is charged to the second predetermined reference voltage. During the charging of the capacitor, the transistor remains open. As soon as the capacitor voltage exceeds the second predetermined reference voltage, the transistor is closed so that the sense voltage is communicated to the circuit output and a filter capacitor, which is disposed in parallel with the circuit output, is charged.

Numerous advantages of the present invention will be appreciated by those skilled in the art.

One advantage of the present invention is that it provides a technique for signicantly improving load regulation for switching power supplies employing auxiliary windings. In particular, overshoot in, for example, a ballistic winding can be completely isolated from a filter capacitor, so that there is no need to utilize elaborate compensating arrangements.

Another advantage of the present invention is that it provides highly desirable levels of load regulation at a low cost, thus providing an inexpensive solution to the problem of loose coupling between the sensing means and the secondary winding. More specifically, cost efficiencies are achieved through use of the present invention since it does not require employment of relatively expensive devices, such as optocouplers.

Yet another advantage of the present invention is that it provides a circuit for eliminating the effects of overshoot which is simply designed so that it can be readily manufactured and implemented. By minimizing componentry requirements of the circuit, cost reductions and production efficiencies are realized.

Yet another advantage of the present invention is that the circuit for eliminating the effects of overshoot can be employed to extend the useful range of a ballistic sense topology over that which is usually possible. More specifically, the limitations typically imposed on the ballistic sense topology as a result of overshoot are excluded. Hence, concerns regarding improper regulation over extended load ranges is substantially alleviated.

Another advantage of the present invention is that the components of the circuit for eliminating the effects of overshoot are optimally arranged to prolong its useful life. For example, the circuit includes a filter capacitor that is advantageously shielded from any overshoot. Moreover, the circuit is designed to minimize power dissipation and facilitate smooth operation.

These and other features, advantages and objects of the present invention will be further understood and appreciated by those skilled in the art by reference to the following written specification, claims and appended drawings.

BRIEF DESCRIPTION OF THE DRAWINGS

FIG. 1 is a prior art circuit diagram depicting a switching power supply employing a ballistic winding;

FIGS. 2a-2c represent current and voltage responses obtained from the prior art switching power supply of FIG. 1 during operation;

FIG. 3 is a circuit diagram embodying the present invention, a portion of which diagram is shown in block form;

DETAILED DESCRIPTION OF THE PREFERRED EMBODIMENT

Figure 4:
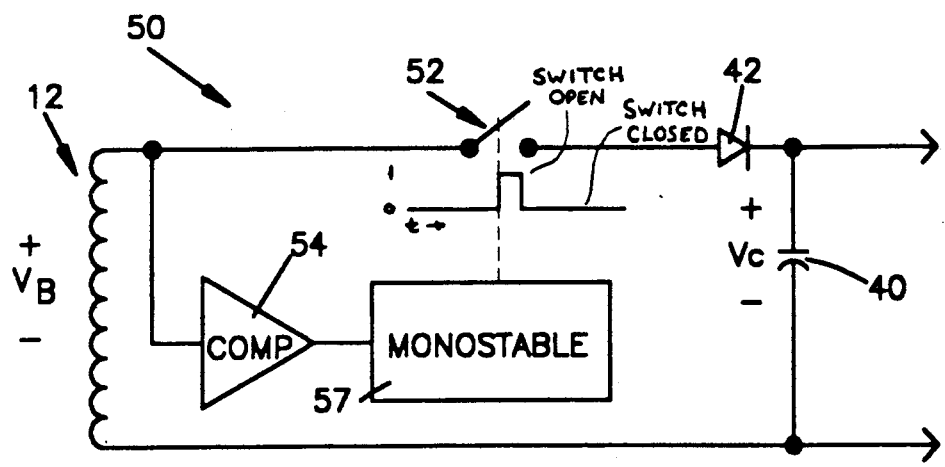
FIG. 4 is another aspect of the invention as illustrated in FIG. 3.

It is to be understood that the invention described below may assume various alternative orientations and step sequences except where expressly specified to the contrary. It is also to be understood that the specific devices and processes illustrated in the attached drawings, and described in the following specification, are simply exemplary embodiments of the inventive concepts defined in the appended claims. Hence, specific dimensions, and other physical characteristics related to the embodiments disclosed herein are not to be considered as limiting, unless the claims by their language expressly state otherwise.

Referring to FIG. 1, a typical switching power supply 10 using sensing means or a ballistic winding 12, is shown. The switching power supply 10 includes transformer 14 about which ballistic winding 12, primary winding 16, and secondary winding 18 are wound. A first end of primary winding 16 is interconnected with one side of a power supply 20 and a second end of primary winding 16 is interconnected with a drain of a MOSFET transistor 22.

The transformer 14 is usually wound so as to minimize leakage inductance between the primary winding 16 and the secondary winding 18. Nonetheless, there is some leakage inductance between the primary and secondary windings 16, 18 which is represented in FIG. 1 by inductor 24. When the transistor 22 is turned off, the trailing edge of the primary current (FIGS. 2a and 2b) passes through this leakage inductance, which is represented by inductor 24, causing the voltage $V_p$ of the primary winding 16 to overshoot. To limit this overshoot and prevent breakdown of transistor 22, a clamp circuit 26, including resistor 28, capacitor 30, and a diode 32, is employed.

A gate of transistor 22 is coupled to a pulse width modulator (PWM) 36. The PWM 36 is also coupled to another side of the power source 20, as well as an output of an operational amplifier 38, which amplifier 38, in the present example, provides an error signal, $e_s$, to the PWM 36. The ballistic winding 12 is operatively associated with a ballistic filter capacitor 40 and a diode 42. One end of the filter capacitor 40 and the negative end of diode 42 ar coupled to the inverting input of amplifier 38 and a reference voltage is transmitted to the non-inverting input of amplifier 38. The secondary winding 18 is operatively associated with a diode 44, which is interconnected with one end of secondary winding 18, and a capacitor 46 which is disposed in parallel with the output of the switching power supply 10.

In operation, when transistor 22 is switched on, current in the transformer 14 (FIG. 2a) rises until the PWM 36 turns the transistor 22 off. Conduction time for transistor 22 is adjusted by the PWM 36 in order to maintain a constant output voltage. The voltage input to the PWM 36 is generated by sensing the output voltage from the ballistic winding 12 and comparing the same to the reference voltage through use of amplifier 38.

Ideally, if the coupling between the ballistic winding 12 and the secondary coupling 18 were perfect, the voltage resulting from the ballistic winding 12 would track the output voltage exactly and the output voltage would change very little in response to load changes. In reality, the coupling between the ballistic winding 12 and the secondary winding 18 is "loose" since the ballistic winding 12 and the secondary winding 18 must be isolated through use of a primary to secondary safety insulation system. On the other hand, coupling between the ballistic winding 12 and the primary winding 16 is typically good so that the voltage changes in the primary winding 16 are reflected in the ballistic winding 12.

Referring to FIG. 2b, the voltage overshoot that occurs on the primary winding 16 as a result of the leakage between the primary and secondary windings 16, 18 is shown. As will be recognized, the voltage $V_p$ of the primary winding 16 is in the form of pulses since the PWM 36 intermittently turns the primary winding 16 on and off (FIG. 2a) in order to achieve desirable levels of load regulation on the secondary side of the transformer 14. As illustrated in FIG. 2c, the overshoot of the primary winding voltage causes the voltage $V_C$ of the filter capacitor 40 to charge up to a level beyond that which would be desired for proper load regulation. As a result of $V_C$ being charged to an undesirably high level, transistor 22 is held on by the PWM 36 for an insufficient amount of time. Consequently, load regulation problems are encountered since the output voltage is decreased relative to the level it would achieve if the filter capacitor 40 were maintained at a representative voltage independent of the overshoot.

Referring again to FIG. 2c, it will be appreciated that as overshoot increases, the actual $V_C$ will differ considerably from the desired $V_C$. For the switching power supply 10 of FIG. 1, the disparity between the actual $V_C$ and the desired $V_C$ will increase as the load is increased. Above certain loads, $V_C$ can no longer be reliably used to regulate load. Consequently, the ballistic sensing technique is only useful over a limited load range, i.e. for load levels in which the overshoot of $V_C$ is relatively small.

Referring to FIG. 3, a simple yet effective implementation, shown partly in block diagram form, for solving the above-described problem of overshoot in $V_C$ is indicated by the numeral 50. In the present description, for the sake of demonstrating the usefulness of the invention in conjunction with switched power supply of FIG. 1, common numerals for common components are used whenever possible. As will be recognized, in FIG. 3 the ballistic winding, diode and capacitor are the same as those components used in FIG. 1. Additionally, the polarity of $V_B$ and the orientation of capacitor 40 and diode 42 to ballistic winding 12 is the same as in FIG. 1. It will be understood by those skilled in the art, however, that the solution to the problem of overshoot in $V_C$ is conceptually based and can be achieved by using various types of components which can be operated with positive and negative voltages. Moreover it should appreciated by those skilled in the art that the solution described below is as applicable to circuits employing auxiliary windings as it is to circuits employing ballistic windings.

A major distinction between the circuit 50 (FIG. 3) and the corresponding circuit 10 of FIG. 1 lies in the use of switching means 52, which is inserted in series with the auxiliary or ballistic winding 12. Additionally, the switching means 52 is coupled with comparator means 54 and delay means 56. In the preferred form of operation, the switch remains open as long as the winding voltage, i.e. $V_B$, is negative. As soon as $V_B$ goes positive and a predetermined time interval set by the delay means 56 has elapsed, the switching means 52 is closed and the ballistic filter capacitor 40 begins to charge.

In the preferred embodiment, the comparator means 54 is employed to trigger the delay means 56 when by the transition of the comparator 54 from a low state to a high state or vice versa. Even more significantly, referring to FIG. 5, the delay $t_D$ set by delay means 56 is to be greater than the time of overshoot, but substantially less than the minimum time that the waveform of $V_C$ or $V_S$ remains positive. Proper setting of the delay insures that the overshoot caused by loose coupling between the ballistic winding 12 and the secondary winding 18 cannot occur and that, in contrast to the situation demonstrated by FIG. 2c, the actual $V_C$ is always the same as the desired $V_C$.

It will be appreciated by those skilled in the art that while, in the preferred embodiment, circuit 50 employs a normally open switch, in another equally preferred embodiment (FIG. 4) the circuit 50 could employ a normally closed switch. For example, the delay means could be replaced with timing means 57, which could take the form of a monostable or the like. In this arrangement, the switch 52 remains closed unless the comparator means 54 undergoes a transition state from low to high or vice versa. As a result of the transition, which in the present example is from low to high, the switch is opened for the time interval $t_D$, and then closed until the next transition occurs.

Figure 5:
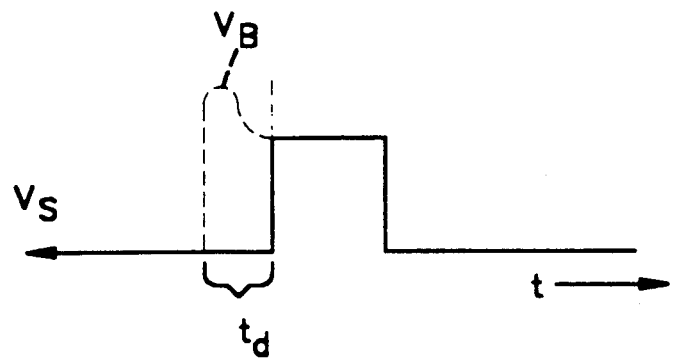
FIG. 5 is a single pulse depicting the operation of the circuit of FIG. 3.
Figure 6:
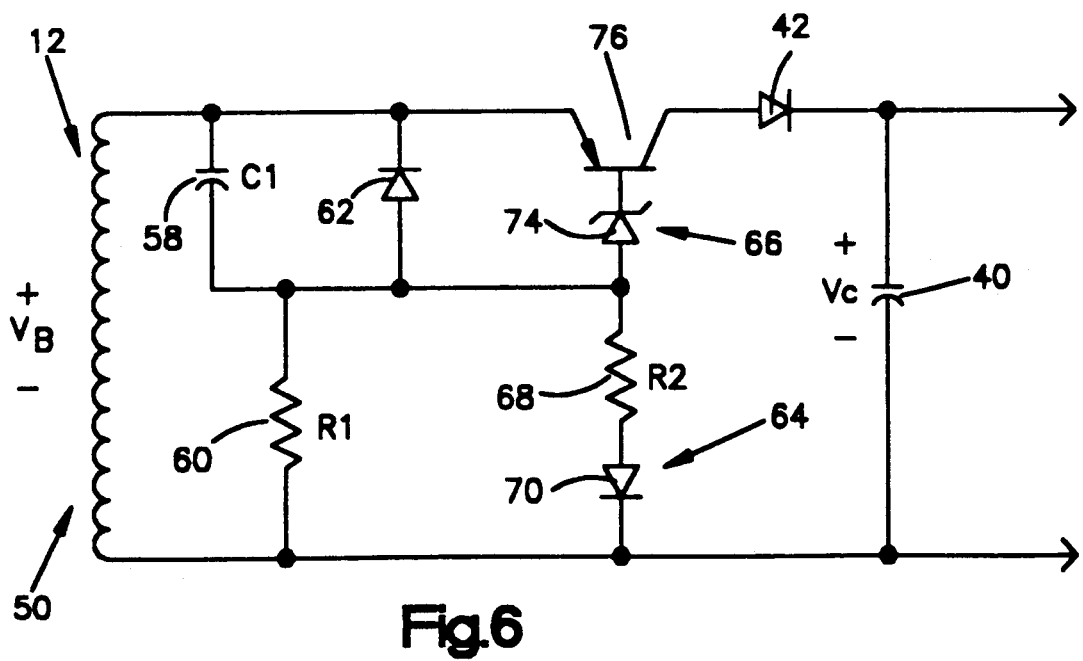
FIG. 6 is a preferred implementation of the circuit of FIG. 3.

Referring to FIG. 5, a preferred embodiment of circuit 50 is shown. The circuit 50 includes a capacitor 58 which is interconnected with a resistor 60 and a diode 62. The capacitor 58 is coupled with branches 64 and 66. The branch 64 includes a resistor 68 which is connected in series with a diode 70. The branch 66 includes a voltage regulator, such as a zener diode 74, connected in series with a transistor 76. In the present example, transistor 76 is a pnp bi-polar transistor, but in other embodiments transistor 76 could be another type of transistor, such as a JFET or MOSFET transistor.

In operation, when the ballistic winding goes positive, capacitor 58 begins to charge positive through resistors 60, 68. The components of circuit 50 could be reoriented to operate under the condition in which the voltage across the ballistic winding 12 goes negative. Once the capacitor voltage reaches the sum of the base-emitter voltage drop and the voltage of the zener diode 74, the transistor 76 is turned on. Thus, the delay is set by the time constant of the capacitor 58 and the resistors 60, 68 taken in parallel.

When the voltage of the ballistic winding goes negative, the capacitor 58 is discharged through resistor 60 until its voltage is the same as that of the diode 70. By discharging capacitor 58 in this manner, the initial charging voltage of capacitor 58 is fixed for each cycle. In the present example, capacitor 58 does not discharge through branch 64 because of the orientation of diode 70. Since the discharge time of capacitor 58 may be much greater than the charge time, the resistance of resistor 60 may be set much greater than the resistance of resistor 68. Thus, using only resistor 60 to discharge capacitor 58 has the advantageous effect of signicantly reducing the power dissipation in resistor 68.

As will be appreciated by those skilled in the art, various electronic or digital devices could be used to effect the function of capacitor 58 as well as the zener diode 74 and the transistor 76. That is, other known analog devices, such as switching diodes and operational amplifiers, as well as digital devices, such as logical circuits, could be used to achieve the functions of switching means 52, comparator means 54, and delay means 56. Thus, for example, switching means 54 could be restructured to be a digital switch which would respond to a logical command, such as logic 0. The thrust of the present invention is to provide a simple and effective circuit implementation that provides the advantageous result best illustrated by FIG. 4, i.e. to eliminate the effects of overshoot on $V_C$. Any arrangement of hardware that provides the basic implementation of FIG. 3 and allows for the result of FIG. 4 is considered to be within the realm of the present invention.

In the foregoing description, it will be readily appreciated by those skilled in the art that modifications may be made to the invention without departing from the concepts disclosed herein. Such modifications are to be considered as included in the following claims unless these claims by their language expressly state otherwise.

I claim:

1. A circuit for limiting the effects of overshoot in a transformer of the type having a primary winding and a secondary winding, the secondary winding being coupled to a load and the circuit having an output, the circuit comprising:

winding means operatively connected to the transformer for generating a winding voltage which varies in response to a change in voltage generated across the primary winding;

switching means for selectively communicating the winding voltage to the circuit output, the switching means having the capacity to be disposed in one of a first position and a second position, the winding voltage being communicated to the output of the circuit when the switching means is disposed in the first position; and switch actuating means responsive to the winding means for disposing the switching means in the first position a predetermined time interval after the winding voltage has exceeded a predetermined reference voltage;

whereby the winding voltage is communicated to the output of the circuit and the effects of overshoot are eliminated in the output voltage of the circuit.

2. The circuit of claim 1, wherein the first position is a switch closed position and the second position is a switch open position.

3. The circuit of claim 1, wherein the switch actuating means includes time delay means for setting the predetermined time interval.

4. The circuit of claim 3, wherein the time delay means includes:

a capacitor having a time constant;

a first resistor being interconnected with the capacitor, both of the first resistor and capacitor being coupled with the winding means wherein the capacitor is charged through the resistor when the winding voltage is one of positive and negative, and the predetermined time interval is substantially equal to the time constant of the capacitor and the first resistor.

5. The circuit of claim 4, further comprising:

a second resistor;

a diode being disposed in series with the second resistor, both of the second resistor and the diode being coupled with the capacitor wherein the capacitor is charged through the first and second resistors, and wherein the diode is oriented so that the capacitor can only be discharged through the first resistor.

6. The circuit of claim 5, wherein the resistance of the first resistor is substantially greater than the resistance of the second resistor.

7. The circuit of claim 1, wherein the switch actuating means includes means for determining when the winding voltage has exceeded the predetermined reference voltage.

8. The circuit of claim 1, wherein the predetermined reference voltage is substantially equal to zero volts.

9. The circuit of claim 1, wherein the switch actuating means includes a capacitor coupled to the winding means, wherein the switching means includes a transistor, and wherein the disposing of the transistor into the first position is responsive to the extent to which the capacitor is charged by the winding means.

10. The circuit of claim 1, wherein the switch actuating means includes voltage regulating means for regulating voltage transmitted to the switching means.

11. The circuit of claim 10, wherein the voltage regulating means is a zener diode.

12. The circuit of claim 1, wherein: the transformer includes a core member and the winding means includes a ballistic winding; and the primary, secondary and ballistic windings are coupled with the core member.

13. The circuit of claim 1, further comprising storage means for storing voltage, the storage means being connected in parallel with the output of the circuit.

14. The circuit of claim 13, wherein the storage means is a capacitor.

15. A method for limiting overshoot in a transformer of the type having a primary winding and a secondary winding, the secondary winding being coupled to a load, the method comprising the steps of:

providing a circuit including winding means, the circuit being operatively connected to the transformer and the circuit having an output;

generating a winding voltage which varies in response to a voltage generated across the primary winding;

providing switching means having the capacity to be disposed in one of a first position and a second position;

disposing the switching means in the first position a predetermined time interval after the winding voltage substantially exceeds a predetermined reference voltage; and whereby the sense voltage is communicated to the output of the circuit and the effect of overshoot is eliminated in the output voltage of the circuit.

16. The method of claim 15, wherein the first position is a switch closed position and the second position is a switch open position.

17. The method of claim 15, wherein the step of the disposing the switching means includes setting the predetermined time interval.

18. The method of claim 17, further comprising the steps of:

providing a capacitor having a time constant;

providing a resistor being interconnected with the capacitor, both of the capacitor and the resistor being coupled with the winding means;

charging the capacitor through the resistor when the winding voltage is one of positive and negative; and wherein the predetermined time interval is defined by the time constant of the capacitor and the resistor.

19. The method of claim 15, wherein the winding voltage is communicated to the circuit output for a second predetermined time interval, and wherein the first predetermined time interval is substantially shorter than the second predetermined time interval.

20. The method of claim 15, wherein the step of disposing the switching means includes:

providing a capacitor being coupled with the winding means;

providing a transistor having a switching voltage; and wherein the step of disposing the switching means occurs after the voltage of the capacitor exceeds the switching voltage.

21. The method of claim 20, further comprising the step of:

providing voltage regulating means having a first end and a second end, the first end of the voltage regulating means being coupled to the capacitor and the second end of the voltage regulating means being coupled to the transistor.

22. The method of claim 15, wherein the step of disposing the switching means includes the step of charging a capacitor with the winding voltage and wherein the method further comprises the steps of:

providing a diode having a voltage drop, the diode being coupled with the capacitor; and discharging the capacitor to an initial charging voltage, the initial charging voltage being substantially the same as the diode voltage drop.

* * * * *